(12) United States Patent
Yoshida et al.

(10) Patent No.: US 9,415,812 B2
(45) Date of Patent: Aug. 16, 2016

(54) VEHICLE HOOD

(71) Applicant: Kobe Steel, Ltd., Kobe-shi (JP)

(72) Inventors: Masatoshi Yoshida, Hyogo (JP); Hideki Ishitobi, Aichi (JP); Koji Oishi, Shizuoka (JP); Tsuyoshi Yamazaki, Shizuoka (JP); Masao Kobori, Shizuoka (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/678,387

(22) Filed: Apr. 3, 2015

(65) Prior Publication Data

US 2015/0291123 A1     Oct. 15, 2015

(30) Foreign Application Priority Data

Apr. 9, 2014 (JP) .................. 2014-080068

(51) Int. Cl.
  *B62D 25/10* (2006.01)
  *B62D 29/00* (2006.01)
  *B60R 21/34* (2011.01)

(52) U.S. Cl.
  CPC ............ *B62D 29/008* (2013.01); *B62D 25/105* (2013.01); *B60R 2021/343* (2013.01)

(58) Field of Classification Search
  CPC ..... B62D 25/10; B62D 25/105; B62D 29/008
  USPC ............................ 296/187.04, 187.09, 193.11
  See application file for complete search history.

(56) References Cited

U.S. PATENT DOCUMENTS

| | | | |
|---|---|---|---|
| 6,726,785 B2* | 4/2004 | Oyama | C22F 1/043 148/439 |
| 6,883,627 B1 | 4/2005 | Staines et al. | |
| 7,150,496 B2* | 12/2006 | Fujimoto | B60R 21/34 180/69.22 |
| 8,051,696 B2* | 11/2011 | Yoshida | B21D 22/22 72/347 |
| 8,420,011 B2* | 4/2013 | Morishita | B22D 11/003 148/439 |
| 8,722,200 B2* | 5/2014 | Sugimoto | B29C 44/1228 156/221 |
| 8,991,908 B2* | 3/2015 | Ikeda | B60R 21/34 296/187.04 |
| 2004/0021342 A1 | 2/2004 | Fujimoto | |
| 2005/0001452 A1* | 1/2005 | White | B62D 24/02 296/193.11 |
| 2005/0082875 A1* | 4/2005 | Ikeda | B60R 21/34 296/193.11 |
| 2006/0163915 A1* | 7/2006 | Ikeda | B60R 21/34 296/193.11 |
| 2008/0007094 A1* | 1/2008 | Ishitobi | B60R 21/34 296/193.11 |

(Continued)

FOREIGN PATENT DOCUMENTS

| | | |
|---|---|---|
| JP | 2001-151159 | 6/2001 |
| JP | 2001-254136 | 9/2001 |

(Continued)

*Primary Examiner* — Gregory Blankenship
(74) *Attorney, Agent, or Firm* — Oblon, McClelland, Maier & Neustadt, L.L.P.

(57) ABSTRACT

An inner panel of a vehicle hood has a 0.2% proof stress of 70 MPa or more and 120 MPa or less after assembling of the inner panel and completion of bake coating. An outer panel has a 0.2% proof stress of 150 MPa or more. The outer panel is made of JIS 5000 or 6000 series aluminum alloy plate material, and the inner panel is made of a JIS 3000 series aluminum alloy plate material. The inner panel has hat-shaped main beads arranged in a center portion. An elongation amount (L−L0)/L0 determined by cross-section line length L of a concave or convex portion of the main bead projected from the surface of the center portion and a line length L0 of a line segment linearly connecting ends of the portion is 0.4 δ to 0.6 δ to a breaking elongation δ in uniaxial tensile deformation.

6 Claims, 4 Drawing Sheets

(56) References Cited

U.S. PATENT DOCUMENTS

| | | | |
|---|---|---|---|
| 2009/0195031 A1* | 8/2009 | Ishitobi | B60R 21/34 296/193.11 |
| 2010/0019540 A1* | 1/2010 | Fujimoto | B60R 21/34 296/193.11 |
| 2010/0244494 A1* | 9/2010 | Yoshida | B60R 21/34 296/193.11 |
| 2010/0314907 A1* | 12/2010 | Iwano | E05B 77/08 296/187.09 |
| 2013/0175827 A1* | 7/2013 | Hashimoto | B60R 21/34 296/193.11 |
| 2013/0241241 A1* | 9/2013 | Sekikawa | B60R 21/34 296/193.11 |
| 2013/0270859 A1* | 10/2013 | Rioja | B62D 29/008 296/187.01 |
| 2014/0015285 A1* | 1/2014 | Ishitobi | B62D 25/105 296/193.11 |
| 2014/0062142 A1* | 3/2014 | Ikeda | B62D 25/12 296/193.11 |
| 2015/0291123 A1* | 10/2015 | Yoshida | B60R 21/34 296/187.04 |

FOREIGN PATENT DOCUMENTS

| | | |
|---|---|---|
| JP | 2003-205866 | 7/2003 |
| JP | 2004-188445 | 7/2004 |
| JP | 2008-024186 | 2/2008 |
| JP | 2008-030574 | 2/2008 |

* cited by examiner

VEHICLE HOOD

CROSS-REFERENCE TO RELATED APPLICATION

This application claims priority of Japanese Patent Application No.: 2014-80068 filed on Apr. 9, 2014, the content of which is incorporated herein by reference.

BACKGROUND OF THE INVENTION

1. Technical Field

The present invention relates to a vehicle hood, such as an automobile hood. More specifically, the present invention relates to a vehicle hood excellent in collision resistance performance with respect to the head of a pedestrian at front surface collision.

2. Description of the Related Art

In an automobile having a hood in the front portion of a vehicle body, the automobile hood has an outer panel, an inner panel, and other reinforcing members. To ensure the rigidity and strength of the hood itself, typically, the outer panel is joined to the inner panel to take a closed cross-sectional structure which closes the space therebetween.

At present, to evaluate the pedestrian protection performance at front surface collision, a Head Injury Criterion (HIC) value (head injury value) calculated from the "acceleration-time" waveform at collision is typically used. As the HIC value becomes lower, the head of a pedestrian is unlikely to be injured at collision. Therefore, a hood structure which lowers the HIC value after ensuring the dent resistance, the tensile rigidity, and the rigidity and strength of the hood is desired.

It is assumed that the head of a pedestrian collides with the center portion of the hood in a collision accident. In the acceleration waveform applied to the head, typically, a first wave occurs when the head comes into contact with the hood at the initial stage of collision, and then, a second wave occurs when the hood is moved in the vehicle downward direction and comes into contact with the hood incorporated components arranged below the hood. To reduce the HIC value, in particular, it is effective to make the second wave of acceleration smaller. For this, at head collision, it is best to absorb the collision energy before the hood comes into contact with the incorporated components. It is desirable to sufficiently ensure the gap between the hood panel and the incorporated components below the hood.

However, when considering the arrangement of the components necessary for an automobile, it is often difficult to sufficiently ensure the gap between the hood panel and the incorporated components. Therefore, desired is a hood structure in which the first wave of acceleration at head collision is increased to a maximum extent to increase the energy absorption amount at the initial stage of collision, whereby reducing the deformation stroke or bringing the second wave of acceleration smaller when the hood comes into contact with the incorporated components.

To ensure the pedestrian protection performance, a structure in which a plurality of substantially hat-shaped beads arranged in substantially parallel are formed in the center portion of the inner panel of the hood has been proposed (JP 2001-151159 A, JP 2003-205866 A, and JP 2008-30574 A). This can ensure the dent resistance and the tensile rigidity required for the hood, thereby improving the pedestrian protection performance at front surface collision.

In the feature of the inner panel of the hood, the substantially hat-shaped beads are arranged. With this, the bending rigidity of the hood panel can be increased to prevent local bending deformation at collision with the head of a pedestrian, so that the impact load can be distributed. Thus, the region in which the collided hood is shifted at head collision is large to increase its weight. As compared with the case of not providing the beads, the first wave of acceleration at head collision becomes larger. In addition, the hat-shaped beads are arranged in substantially parallel. Thus, the inner panel is likely to be deformed when it comes into contact with the incorporated components below the hood, which can make the second wave of acceleration smaller.

SUMMARY OF THE INVENTION

Such a hood panel is arranged on the front side of a vehicle in which in many cases, an engine is mounted, and is a panel component arranged above the engine. For weight reduction of the vehicle itself, lowering its center-of-gravity, and weight balance on the front and rear sides, the demand to reduce the weight of the hood panel is high. Consequently, for the hood panel, used is an aluminum material which is lighter than a steel plate component which has been conventionally used. However, since the aluminum hood is lighter than the steel plate hood, the initial acceleration at collision with the head of a pedestrian is low, and thus, the pedestrian protection performance is often deteriorated.

In addition, the aluminum material has a lower breaking elongation than the steel plate, and causes break at press molding. The inner panel of the automobile hood has a lower molding height at press molding than other automobile panel components, such as a door, and is a relatively easily molded component, but is difficult to ensure moldability. Therefore, at the initial stage in which the aluminum material is adopted for the inner panel, a 5000 series aluminum alloy which is, in particular, excellent in moldability has been adopted. With recent uni-alloying in consideration of the recycle performance, a 6000 series aluminum alloy has increasingly been adopted for the inner panel. However, the 6000 series aluminum alloy has lower moldability than the 5000 series aluminum alloy plate material. Structure design in consideration of the moldability is essential.

Further, the material cost of the aluminum is higher than the material cost of the steel plate which has been conventionally used. From the viewpoint of attaining both material cost reduction and weight reduction, for the material used for the hood, some application of a 3000 series aluminum alloy which is relatively more inexpensive than other aluminum alloys used for such as an aluminum can to the automobile panel has been studied. In JP 2004-188445 A and JP 2001-254136 A, the 3000 series aluminum alloy is adopted for the outer panel. However, the 3000 series aluminum alloy plate material has a lower proof stress of the material than the 5000 or 6000 series aluminum alloy plate material. As a result, when the 3000 series aluminum alloy plate material is applied to the outer panel, plastic deformation is likely to be caused, and the low dent resistance is problematic. In addition, the 3000 series aluminum alloy plate material has a lower breaking elongation than the 5000 or 6000 series aluminum alloy. As a result, when the 3000 series aluminum alloy plate material is applied to the inner panel, break at press molding cannot be avoided, and thus, there has been a problem that in many cases, the product shape cannot be formed. Consequently, the hood panel in which the 3000 series aluminum alloy plate material is used has not been in practical use.

The present invention has been made in view of the above problems, and it is an object of the present invention to provide a vehicle hood capable of further improving the performance for protecting the head of a pedestrian at collision with the pedestrian by front surface collision.

A vehicle hood according to the present invention comprises an outer panel and an inner panel. A 0.2% proof stress of a material of the inner panel is 70 MPa or more and 120 MPa or less after completion of bake coating of the inner panel subsequently executed after assembling of the vehicle hood. A 0.2% proof stress of a material of the outer panel is 150 MPa or more.

The outer panel is preferably made of a JIS 5000 or 6000 series aluminum alloy plate material and the inner panel is preferably made of a JIS 3000 series aluminum alloy plate material.

Further, it is preferable that the inner panel has a plurality of hat-shaped main beads arranged in a center portion except for an edge thereof, that the main beads are projected in a vehicle upward or downward direction and are arranged in parallel, and that in a cross-sectional shape orthogonal to each main bead, an elongation amount (L−L0)/L0 determined by a cross-section line length L of a concave portion or a convex portion projected from the surface of the center portion and a line length L0 of a line segment linearly connecting ends of the concave portion or the convex portion is 0.4 δ to 0.6 δ with respect to a breaking elongation δ in uniaxial tensile deformation of the material of the inner panel.

Furthermore, it is preferable that the inner panel is made of a JIS 3104 material with a plate thickness of 1.0 mm or less, and that the elongation amount (L−L0)/L0 of the cross section of the concave portion or the convex portion forming the main bead is 0.08 to 0.12.

According to the present invention, the 0.2% proof stress of the material of the inner panel is 70 MPa or more and 120 MPa or less after completion of bake coating of the inner panel subsequently executed after assembling of the vehicle hood, and the 0.2% proof stress of the material of the outer panel is 150 MPa or more. By setting the material strength balance of the outer panel and the inner panel in this manner, the pedestrian protection performance at collision can be improved after ensuring of the predetermined accuracy of the hood, as compared with the conventional vehicle hoods which use the JIS 5000 or 6000 series aluminum alloy for both the outer panel and the inner panel.

BRIEF DESCRIPTION OF THE DRAWINGS

The foregoing and the other features of the present invention will become apparent from the following description and drawings of an illustrative embodiment of the invention in which.

DETAILED DESCRIPTION OF THE PREFERRED EMBODIMENTS

Hereinafter, an embodiment of the present invention will be described with reference to the accompanying drawings.

Figure 1:
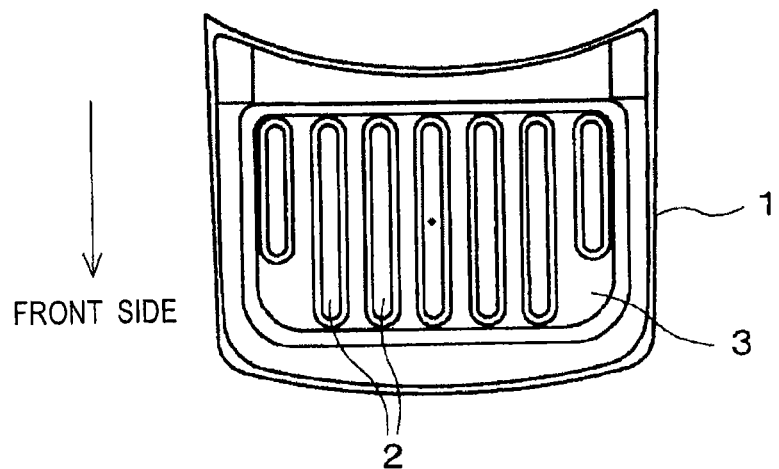
FIG. 1 is a plan view of an inner panel of a vehicle hood according to an embodiment of the present invention.
Figure 2:
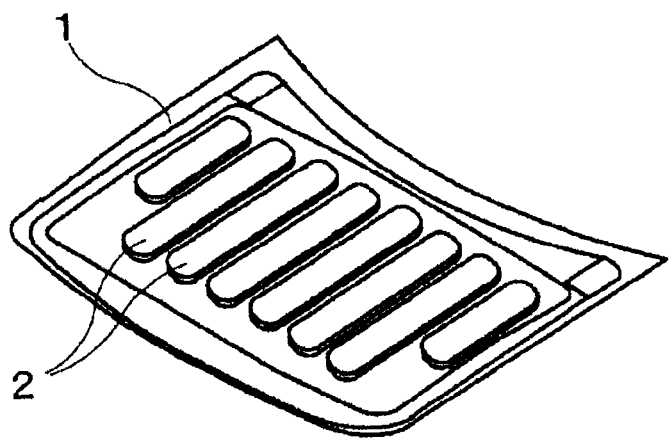
FIG. 2 is a perspective view of the inner panel viewed from an upper side.

FIG. 1 is a top view illustrating an inner panel 1 of a vehicle hood according to the embodiment of the present invention, and FIG. 2 is a perspective view seen from the top thereof. In the inner panel 1 of the vehicle hood, a plurality of main beads 2 extended in the vehicle front-rear direction are formed in a center portion 3 except for the edge thereof. The center portion 3 is a base which is entirely raised in the vehicle upward direction from the peripheral edge of the inner panel 1. In the embodiment illustrated in FIG. 1, the main beads 2 formed in the center portion 3 are raised in the vehicle upward direction from the surface of the center portion 3.

Figure 3:
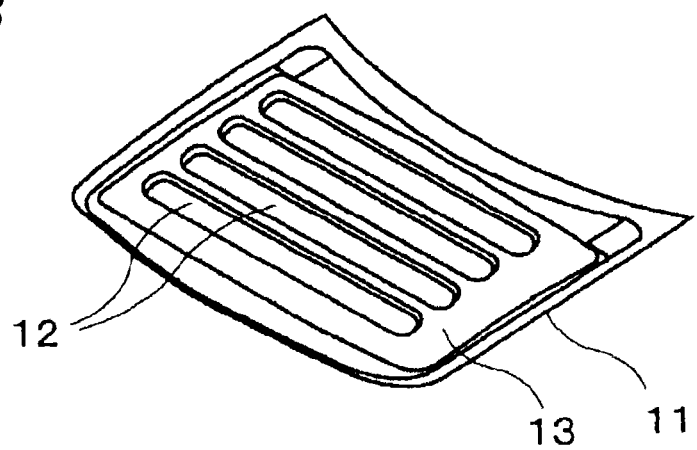
FIG. 3 is a perspective view of an inner panel of a vehicle hood according to other embodiment of the present invention.

As illustrated in FIG. 3, a plurality of main beads 12 can also be formed in the center portion except for an edge 11 of the inner panel 1 so as to be extended in the direction orthogonal to the vehicle traveling direction. In the embodiment in FIG. 3, the main beads 12 are projected in the vehicle downward direction from the surface of a center portion 13. In this way, the direction in which the main beads 12 are extending and projecting can be selected, as needed, according to the shape and size of the hood.

An outer panel 100 is connected to the inner panel 1 at their edges on the vehicle upper side.

The outer panel is preferably molded of a Japan Industrial Standard (JIS) 5000 or 6000 series aluminum alloy. In addition, the material of the inner panel 1 is preferably a JIS 3000 series aluminum alloy. Further, the inner panel 1 is preferably made of a JIS 3104 material whose plate thickness is 1.0 mm or less.

Figure 4A:
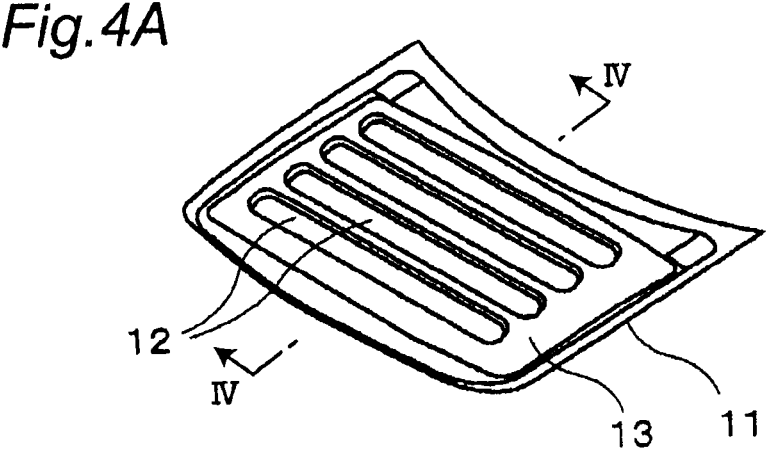
FIG. 4A is a perspective view of the inner panel.
Figure 4B:
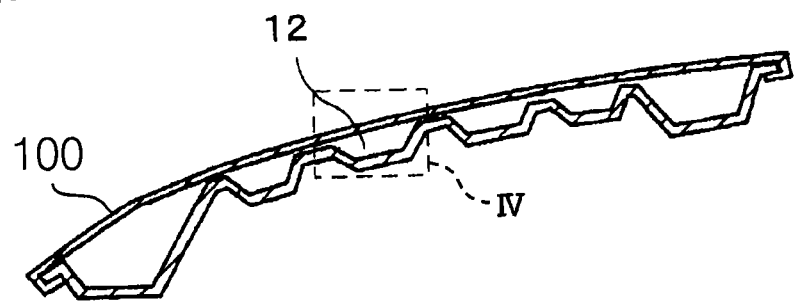
FIG. 4B is a section view of the inner panel taken along a line IV-IV of FIG. A.
Figure 4C:
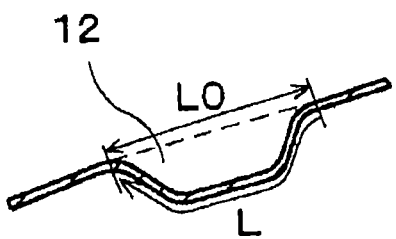
FIG. 4C is an enlarged view of a portion IV of FIG. 4B.

As illustrated in FIGS. 4A to 4C, by taking an inner panel 11 of the embodiment in FIG. 3 as an example, in the cross-sectional shape orthogonal to each main bead 12 provided in the inner panel, an elongation amount (L−L0)/L0 determined by cross-section line length L of a concave portion (or a convex portion) projected from the surface of the center portion 13 and line length L0 (the material length before deformation) of the line segment linearly connecting the ends of the concave portion (or the convex portion) is preferably 0.4 δ to 0.6 δ where δ is the breaking elongation in uniaxial tensile deformation of the material of the inner panel.

Further, the inner panel is desirably made of the JIS 3104 material whose plate thickness is 1.0 mm or less, and the elongation amount (L−L0)/L0 of the cross section of the concave portion or the convex portion forming each main bead is preferably 0.08 to 0.12.

In this embodiment, the 0.2% proof stress of the material of the inner panel 1 is 70 MPa to 120 MPa after completion of bake coating of the inner panel subsequently executed after assembling of the vehicle hood (typically, its bake coated state at a predetermined temperature after stretch by approximately 2%).

Figure 5:
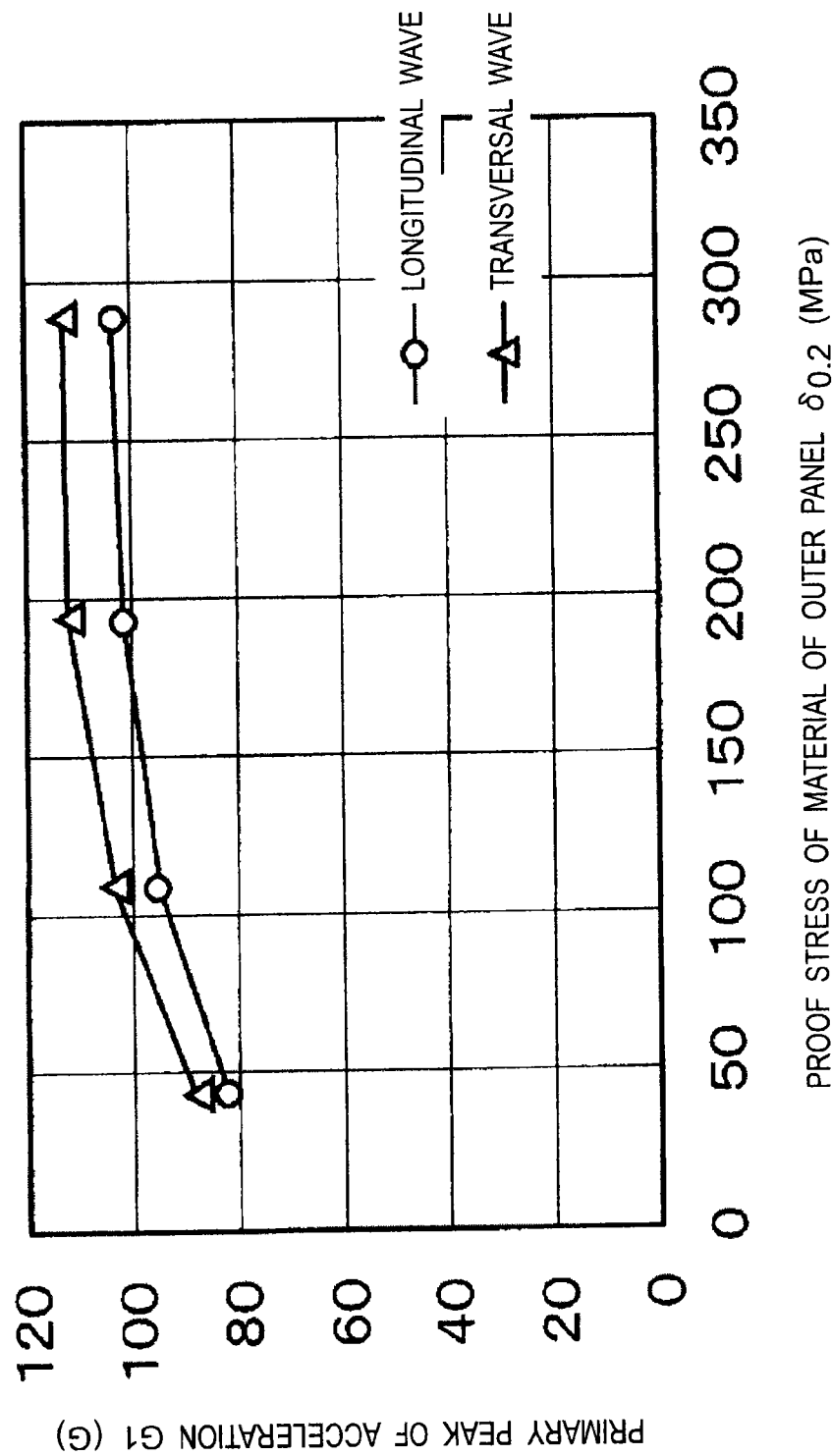
FIG. 5 is a graph showing a correlation between 0.2% proof stress of an outer panel and primary peak of acceleration.

FIG. 5 is a graph illustrating the relation between the 0.2% proof stress of the outer panel and the primary peak of acceleration G1(G) in which the horizontal axis represents the 0.2% proof stress and the vertical axis represents the primary peak of acceleration G1(G). The 0.2% proof stress of the material of the outer panel indicates the value of the state after completion of bake coating of the inner panel subsequently executed after assembling of the vehicle hood (typically, its bake coated state at a predetermined temperature after stretch by approximately 2%). As illustrated in FIG. 5, when the strength of the material of the outer panel is increased, the area in which at head collision, the stress is propagated to cause shift is large. That is, the weight of the shifted portion is increased to make a first wave of acceleration at head collision larger. The primary peak of acceleration becomes higher according to the increase of the 0.2% proof stress of the material of the outer panel up to 190 MPa, and thus, the proof stress of the material is desirably high. Further, the present inventors have revealed that the increase rate of the primary peak of acceleration is decreased according to the increase of the proof stress, and is almost constant at a proof stress of 190 MPa or more even when the proof stress is further increased, and when the 0.2% proof stress is 150 MPa or more, 90% or more of the maximum value of the primary peak of acceleration can be ensured. In consideration of this, to ensure the energy absorption amount necessary for the initial stage of head collision, the 0.2% proof stress of the material of the outer panel is required to be at least 150 MPa or more, preferably, 190 MPa or more.

The secondary peak of acceleration when at head collision, the hood collides with the hood incorporated components, such as an engine, mounted therebelow greatly depends on the proof stress of the material of the inner panel 1, and is decreased as the material strength becomes lower. This is because, when the inner panel 1 collides with the incorporated components, the acceleration becomes lower due to the low deformation resistance of the inner panel 1. With this, the deformation stroke of the inner panel 1 becomes longer. When the 0.2% proof stress of the material of the inner panel 1 of the hood becomes extremely low, the energy cannot be absorbed even when the inner panel 1 is completely collapsed, and thus, the secondary peak of acceleration becomes extremely high. That is, the material strength of the inner panel 1 should be proper.

To the inner panel 1 of the vehicle hood, a striker and a hinge for fastening the inner panel 1 to the vehicle body are attached. From the viewpoint of ensuring the strength at the mounting portion, such as the striker, and of preventing break at press molding, the proof stress of the material of the inner panel 1 which is excessively lowered results in an adverse effect. To eliminate this, for the mounting portion with the striker and hinge, typically, a reinforcing member is arranged to ensure the deformation strength. However, in the case that a load is directly inputted to the portion in which the reinforcing member of the inner panel is not provided, such as a cushion rubber seating surface, to which the reinforcing member is difficult to be set, when the proof stress of the material of the inner panel 1 becomes too low, plastic deformation is likely to be caused with respect to the load input with opening and closing of the hood. From these points, the present inventors have found that the 0.2% proof stress of the material of the inner panel 1 is required to be 70 MPa to 120 MPa. By setting the 0.2% proof stress of the inner panel in this manner, the strength of the vehicle body mounting portion can be ensured. As compared with the 5000 or 6000 series aluminum alloy which has been used for the conventional hoods, the secondary peak of acceleration and the HIC value at head collision can be reduced. In addition, as compared with the conventional hoods, the pedestrian protection performance can be improved.

Figure 6:
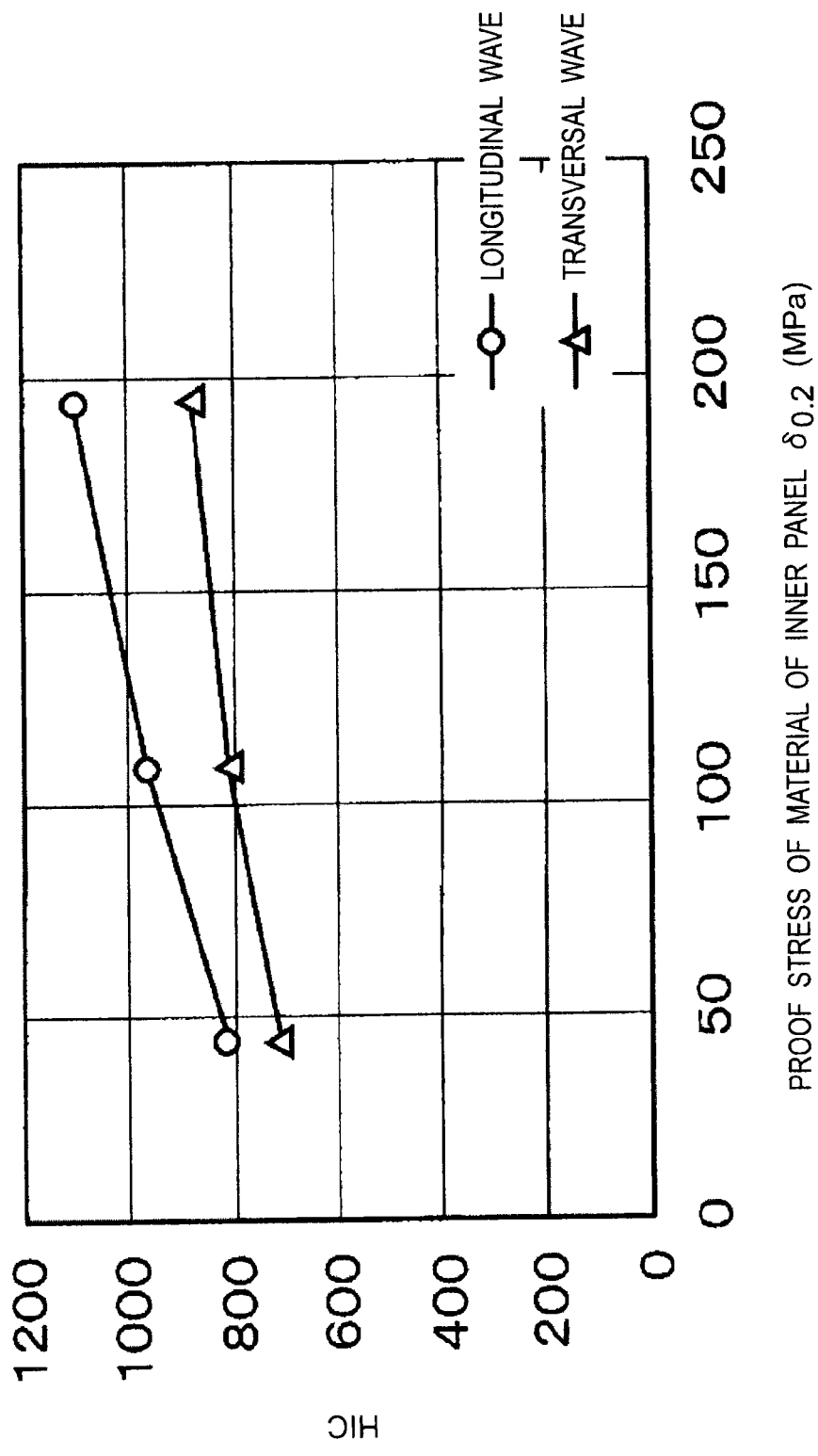
FIG. 6 is a graph showing a correlation between 0.2% proof stress of an inner panel and HIC.

FIG. 6 is a graph illustrating the relation between the 0.2% proof stress of the material of the inner panel 1 and the HIC value in which the horizontal axis represents the 0.2% proof stress and the vertical axis represents the HIC value. The data are obtained by calculating the HIC value from the computer aided engineering (CAE) analysis which simulates the head collision test under the European New Car Assessment Program (E-NCAP) child collision conditions. The longitudinal wave structure in FIG. 6 is a structure which has, as illustrated in FIG. 1, the main beads extended in the vehicle front-rear direction and having a convex shape in the vehicle upward direction. The transversal wave structure in FIG. 6 is a structure which has, as illustrated in FIG. 3, the main beads extended in the vehicle left-right direction and having a convex shape in the vehicle downward direction. The E-NCAP child collision test is a test for evaluating the pedestrian head protection performance by colliding a head impactor having a weight of 3.5 kg with the hood at a collision speed of 40 km/h and at a collision angle of 50° (the angle between the hitting direction of the head impactor and the horizontal axis) and by calculating the HIC value from the acceleration added to the head impactor at that time. In this calculation, below the hood, a rigid wall which simulates the incorporated components, such as the engine, is set to the position in a distance of 70 mm in the direction in which it is tilted 65° from the surface of the outer panel. The HIC value is decreased as the 0.2% proof stress of the inner panel 1 becomes lower. In particular, when the 0.2% proof stress is 120 MPa, the HIC value under the conditions is 1000 or less in the hood provided with the beads in the vehicle front-rear direction illustrated in FIG. 1, which can satisfy the European laws and regulations. From this result, the 0.2% proof stress of the inner panel is desirably 120 MPa or less. In addition, in the above hood structure, the transversal wave structure is more excellent in the pedestrian protection performance than the longitudinal wave structure. In consideration of the merits and demerits of other performance, such as the hood rigidity, except for the pedestrian protection performance, the result may be different depending on the design of the hood outer panel and the hood size. However, for the pedestrian protection performance, it is desirable to adopt the structure in FIG. 3 having the main beads 12 extended in the vehicle left-right direction and having a convex shape in the vehicle downward direction.

When the 0.2% proof stress of the inner panel 1 is too low, the deformation strength of the inner panel itself is lowered. When the 0.2% proof stress is less than 70 MPa, plastic deformation caused with respect to the impact load added to the cushion rubber seating surface of the inner panel 1 is problematic. From the strength requirement for the hood itself, the 0.2% proof stress of the inner panel 1 is thus required to be 70 MPa or more. As described above, when the 0.2% proof stress of the inner panel 1 is increased, the HIC value becomes higher, resulting in lowering the pedestrian protection performance. In addition, depending on the conditions, it becomes difficult to satisfy the laws and regulations. The 0.2% proof stress is thus required to be 120 MPa or less. Further, when the 0.2% proof stress of the outer panel is less than 150 MPa, the primary peak of acceleration becomes too low. The energy absorption amount at the initial stage of collision thus becomes smaller, resulting in lowering the pedestrian protection performance. The 0.2% proof stress of the outer panel is thus preferably 150 MPa or more.

Therefore, the 0.2% proof stress of the material of the inner panel 1 is 70 MPa to 120 MPa after completion of bake coating after assembling of the inner panel 1 to the vehicle hood. In addition, the 0.2% proof stress of the material of the outer panel is desirably 150 MPa or more.

As the material having such a strength characteristic, it is desirable to use the 5000 or 6000 series aluminum alloy for the outer panel, and to use the 3000 series aluminum alloy for the inner panel 1. In particular, the outer panel made of the 6000 series aluminum alloy is hard baked in bake coating after assembling, and thus, the material strength can be higher. On the other hand, the 3000 series aluminum alloy applied to the inner panel does not have such a characteristic, and thus, the strength after bake coating is not increased. With this, the requirement of the 0.2% proof stress of the materials of the vehicle hood for achieving the object of the present invention can be easily obtained. In addition, the 3000 series aluminum alloy typically applied to the body portion of a can is manufactured at relatively low cost, as compared with the 5000 or 6000 series aluminum alloy plate material. The cost can thus be reduced.

In addition, the inner panel made of the 3000 series aluminum alloy is effective in ensuring the recycle performance. For instance, as disclosed in JP 2001-254136 A, when the material with a 3000 series aluminum alloy-based composition is used for the inner panel and is recycled together with the 6000 series aluminum alloy, the composition of the inner panel can be easily restored. In particular, the JIS 3104 aluminum alloy material whose Si allowable range is wide is preferable in that by combining it with the outer panel made of the 6000 series aluminum alloy, the recycle performance can be easily ensured.

The problem in achieving the inner panel made of the 3000 series aluminum alloy is that the breaking elongation is low. Thus, avoiding break at press molding is the biggest problem. In the conventional aluminum hoods, when such a low breaking elongation material is adopted, it is difficult to avoid break in structure. As represented by JP No. 2003-205866 A, etc., for the hood structure in which a plurality of the hat-shaped beads in parallel are formed in the center portion of the hood inner panel, the cross-sectional shape of each bead is formed to be wavy at a relatively gentle curvature. Thus, there is an advantage that local strain concentration and break at press molding are unlikely to be caused.

In particular, as disclosed in JP No. 2008-30574 A, the structure which has a plurality of the hat-shaped main beads projected in the vehicle downward direction from the surface close to the outer panel side is effective in that the free degree of the mastic arrangement joining the outer panel and the inner panel can be ensured, and break at press molding can be prevented. That is, this structure is excellent in the pedestrian protection performance and press moldability.

In the inner panel in which a plurality of the hat-shaped beads are formed, proposed is a structure to avoid break by defining the shape of the hat-shaped cross section of each bead, that is, the angle of the vertical wall. However, this structure is for the typical inner panel made of the 5000 or 6000 series aluminum alloy. When the inner panel is molded of the 3000 series aluminum alloy material which is likely to cause break, it is necessary to set the requirement for avoiding break, not only to the ends, but also to the cross section itself forming the hat-shaped portion which is infrequently broken in the case of using the 5000 or 6000 series aluminum alloy plate material.

To avoid break, it is necessary to reduce the depth of each hat-shaped bead to make the change in the line length of the cross section gentler. However, when the depth of each bead is reduced, the rigidity of the hood inner panel itself is lowered. It is thus necessary to increase the depth of each bead to a maximum extent so as not to cause break at press molding. For the cross-sectional shape of the wavy portion, as disclosed in JP 2008-24186 A, the angle of the inclining surface of each bead provided in the inner panel is defined in connection with improvement in the pedestrian protection performance. However, there are no conventional techniques defined from the viewpoint of the rigidity and press moldability.

The present inventors have found that when in the cross-sectional shape orthogonal to each main bead provided in the inner panel, the elongation amount $(L-L0)/L0$ determined by cross-section line length L of the concave portion or the convex portion projected from the outer surface and line length L0 (the material length before deformation) of the line segment linearly connecting the ends of the concave portion or the convex portion is $0.4\,\delta$ to $0.6\,\delta$ with respect to breaking elongation $\delta$ in the uniaxial tensile deformation of the material of the inner panel, the hood rigidity can be ensured to prevent break at press molding in most cases. Here, when the elongation amount $(L-L0)/L0$ is more than $0.6\,\delta$, break is caused, and when it is less than $0.4\,\delta$, the projection amount of each bead is small, and thus, the surface rigidity of the hood becomes too low.

Further, specifically, the inner panel is desirably molded of the 3104 aluminum material whose plate thickness is 1.0 mm or less. In this case, the elongation amount $(L-L0)/L0$ of each main bead is preferably 0.08 to 0.12. When the elongation amount $(L-L0)/L0$ is less than 0.08, the projection amount of each main bead is small, and thus, the rigidity of the hood is likely to be lower. When the elongation amount $(L-L0)/L0$ is more than 0.12, break is likely to be caused in the vertical wall forming each main bead or the shoulder therenear.

In this way, in this embodiment, preferably, a plurality of the hat-shaped main beads 2 or 12 are formed in the center portion except for the edge of the inner panel 1 or 11, and in the cross-sectional shape orthogonal to each main bead 2 or 12, the elongation amount $(L-L0)/L0$ determined by cross-section line length L of the concave portion or the convex portion projected from the surface of the center portion 3 or 13 and line length L0 (the material length before deformation) of the line segment linearly connecting the ends of the concave portion or the convex portion is $0.4\,\delta$ to $0.6\,\delta$ with respect to $\delta$. In particular, the inner panel 1 or 11 is desirably made of the JIS 3104 material whose plate thickness is 1.0 mm or less. In this case, the elongation amount $(L-L0)/L0$ is desirably 0.08 to 0.12.

According to the present invention, the vehicle hood excellent in the head protection performance at pedestrian collision can be obtained. The present invention is thus suitable as the vehicle hood excellent in the pedestrian protection performance and safety.

What is claimed is:

1. A vehicle hood comprising:
    an outer panel; and
    an inner panel connected to the outer panel at an edge of the panels, to provide a space therebetween,
    wherein a 0.2% proof stress of a material of the inner panel is 70 MPa or more and 120 MPa or less after completion of bake coating of the inner panel subsequently executed after assembling of the vehicle hood, and
    wherein a 0.2% proof stress of a material of the outer panel is 150 MPa or more.

2. The vehicle hood according to claim 1, wherein the outer panel is made of a JIS 5000 or 6000 series aluminum alloy plate material, and the inner panel is made of a JIS 3000 series aluminum alloy plate material.

3. The vehicle hood according to claim 1,
    wherein the inner panel has a plurality of hat-shaped main beads arranged in a center portion except for an edge thereof,
    wherein the main beads are projected in a vehicle upward or downward direction and are arranged in parallel.

4. A vehicle hood comprising:
    an outer panel; and
    an inner panel,
    wherein a 0.2% proof stress of a material of the inner panel is 70 MPa or more and 120 MPa or less after completion of bake coating of the inner panel subsequently executed after assembling of the vehicle hood, and
    wherein a 0.2% proof stress of a material of the outer panel is 150 MPa or more, wherein the inner panel has a plurality of hat-shaped main beads arranged in a center portion except for an edge thereof, wherein the main beads are projected in a vehicle upward or downward direction and are arranged in parallel, wherein in a cross-sectional shape orthogonal to each main bead, an elongation amount $(L-L0)/L0$ determined by a cross-section line length L of a concave portion or a convex portion projected from the surface of the center portion and a line length L0 of a line segment linearly connecting ends of the concave portion or the convex portion is $0.4\ \delta$ to $0.6\ \delta$ with respect to a breaking elongation $\delta$ in uniaxial tensile deformation of the material of the inner panel.

5. The vehicle hood according to claim 4, wherein the inner panel is made of a JIS 3104 material with a plate thickness of 1.0 mm or less, and wherein the elongation amount $(L-L0)/L0$ of the cross section of the concave portion or the convex portion forming the main bead is 0.08 to 0.12.

6. The vehicle hood according to claim 4, wherein the outer panel is made of a JIS 5000 or 6000 series aluminum alloy plate material, and the inner panel is made of a JIS 3000 series aluminum alloy plate material.

\* \* \* \* \*